US008467270B2

(12) United States Patent
Gossweiler, III et al.

(10) Patent No.: US 8,467,270 B2
(45) Date of Patent: Jun. 18, 2013

(54) SMART-WATCH WITH USER INTERFACE FEATURES

(75) Inventors: Richard Carl Gossweiler, III, Sunnyvale, CA (US); James Brooks Miller, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/281,851

(22) Filed: Oct. 26, 2011

(65) Prior Publication Data

US 2013/0107674 A1 May 2, 2013

(51) Int. Cl.

| | |
|---|---|
| ***G04B 47/00*** | (2006.01) |
| ***A44C 5/00*** | (2006.01) |
| ***G04B 3/00*** | (2006.01) |
| ***G06F 3/041*** | (2006.01) |
| ***H04M 1/00*** | (2006.01) |
| ***G04G 21/08*** | (2010.01) |

(52) U.S. Cl.
USPC .............. 368/10; 368/281; 368/282; 345/173

(58) Field of Classification Search
USPC ........... 368/10, 13, 88, 281, 282; 24/265 WS; 63/1.13, 3; 224/164, 165; 379/433.1; 455/556.2, 455/566, 575.1, 575.6; 345/173, 175
See application file for complete search history.

(56) References Cited

U.S. PATENT DOCUMENTS

| | | | | | |
|---|---|---|---|---|---|
| 4,130,987 | A | * | 12/1978 | Schickedanz | 368/29 |
| 4,141,074 | A | * | 2/1979 | Popper | 708/111 |
| 4,236,239 | A | * | 11/1980 | Imgruth et al. | 368/72 |
| 4,255,801 | A | * | 3/1981 | Ode et al. | 368/10 |
| 4,403,869 | A | | 9/1983 | Crutcher | |
| 4,412,751 | A | * | 11/1983 | Jeannet et al. | 368/276 |
| 4,419,770 | A | * | 12/1983 | Yagi et al. | 455/301 |
| 4,586,827 | A | * | 5/1986 | Hirsch et al. | 368/282 |
| 4,800,543 | A | | 1/1989 | Lyndon-James et al. | |
| 4,817,065 | A | * | 3/1989 | Usui et al. | 368/62 |
| 5,020,039 | A | * | 5/1991 | Yokote | 368/282 |
| 5,050,138 | A | | 9/1991 | Yamada et al. | |
| 5,077,710 | A | * | 12/1991 | Gogniat | 368/280 |
| 5,081,852 | A | * | 1/1992 | Cox | 63/3 |
| 5,138,590 | A | | 8/1992 | Masuda et al. | |
| 5,251,189 | A | * | 10/1993 | Thorp | 368/4 |

(Continued)

FOREIGN PATENT DOCUMENTS

| | | | |
|---|---|---|---|
| EP | 1175017 | A2 | 1/2002 |
| WO | 98/005148 | A1 | 2/1998 |
| WO | 01/35173 | A1 | 5/2001 |
| WO | 2010097692 | A1 | 9/2010 |

OTHER PUBLICATIONS

PCT International Search Report and Written Opinion dated Dec. 14, 2012 for PCT International Application No. PCT/US2012/061941 (12 pages).

*Primary Examiner* — Vit W Miska
(74) *Attorney, Agent, or Firm* — Morris & Kamlay LLP

(57) ABSTRACT

A smart-watch can include a wristband, a base, a battery and a first auxiliary component. The wristband can include a voltage line. The base can be coupled to the wristband and include a housing, a processor, and a wireless transceiver in communication with the processor. The wireless transceiver can be configured to connect to a wireless network. The battery can be coupled to the housing and be in communication with the processor and the voltage line. The first auxiliary component can be coupled to the wristband in communication with the voltage line and be powered by the battery.

8 Claims, 4 Drawing Sheets

U.S. PATENT DOCUMENTS

| | | | | |
|---|---|---|---|---|
| 5,274,613 | A | 12/1993 | Seager | |
| 5,280,296 | A * | 1/1994 | Tan et al. | 343/718 |
| 5,416,730 | A * | 5/1995 | Lookofsky | 361/679.09 |
| 5,499,398 | A * | 3/1996 | Kudoh et al. | 455/290 |
| 5,615,179 | A * | 3/1997 | Yamamoto et al. | 368/281 |
| 5,872,744 | A * | 2/1999 | Taylor | 368/13 |
| 5,889,737 | A * | 3/1999 | Alameh et al. | 368/204 |
| 6,035,035 | A | 3/2000 | Firooz | |
| 6,158,884 | A | 12/2000 | Lebby et al. | |
| 6,192,253 | B1 * | 2/2001 | Charlier et al. | 455/575.7 |
| 6,212,414 | B1 * | 4/2001 | Alameh et al. | 455/575.6 |
| 6,285,757 | B1 | 9/2001 | Carroll et al. | |
| 6,359,837 | B1 | 3/2002 | Tsukamoto | |
| 6,408,072 | B1 * | 6/2002 | Fernandez-Martinez | 379/433.1 |
| 6,430,110 | B2 | 8/2002 | Baroche | |
| 6,529,713 | B1 | 3/2003 | Seymour | |
| 6,590,835 | B2 * | 7/2003 | Farine et al. | 368/10 |
| 6,618,328 | B1 | 9/2003 | Ellner et al. | |
| 6,619,835 | B2 * | 9/2003 | Kita | 368/281 |
| 6,619,836 | B1 * | 9/2003 | Silvant et al. | 368/281 |
| 6,681,014 | B1 | 1/2004 | Ghassabian | |
| 6,863,539 | B2 * | 3/2005 | Marmaropoulos | 439/37 |
| 6,873,575 | B2 | 3/2005 | Yamazaki et al. | |
| 6,874,931 | B2 * | 4/2005 | Noirjean et al. | 368/282 |
| 6,960,016 | B2 * | 11/2005 | Apothloz et al. | 368/282 |
| 7,126,626 | B2 | 10/2006 | Sawahara et al. | |
| 7,234,010 | B2 | 6/2007 | Gilmour | |
| 7,345,954 | B2 * | 3/2008 | Ehrsam et al. | 368/10 |
| 7,398,151 | B1 | 7/2008 | Burrell et al. | |
| 7,441,415 | B2 * | 10/2008 | Radley-Smith | 63/3 |
| 7,450,107 | B2 * | 11/2008 | Radley-Smith | 345/156 |
| 7,453,936 | B2 * | 11/2008 | Kondo | 375/240 |
| 7,463,205 | B2 | 12/2008 | Turner et al. | |
| 7,513,019 | B2 * | 4/2009 | Friedman et al. | 24/265 WS |
| 7,618,260 | B2 | 11/2009 | Daniel et al. | |
| 7,817,863 | B2 * | 10/2010 | Kondo | 382/232 |
| 7,841,209 | B2 * | 11/2010 | Radley-Smith | 63/1.13 |
| 7,849,620 | B2 * | 12/2010 | Hussey et al. | 40/633 |
| 8,014,635 | B2 * | 9/2011 | Kondo | 382/312 |
| 8,059,491 | B1 * | 11/2011 | Hennings-Kampa | 368/14 |
| 2001/0011025 | A1 | 8/2001 | Ohki et al. | |
| 2001/0017663 | A1 | 8/2001 | Yamaguchi et al. | |
| 2002/0012292 | A1 | 1/2002 | Mitamura | |
| 2002/0101349 | A1 * | 8/2002 | Rojas, Jr. | 340/573.1 |
| 2002/0142810 | A1 | 10/2002 | Kawasaki et al. | |
| 2003/0019894 | A1 | 1/2003 | Caldana | |
| 2003/0030595 | A1 * | 2/2003 | Radley-Smith | 345/1.3 |
| 2003/0123329 | A1 * | 7/2003 | Guanter et al. | 368/82 |
| 2003/0133515 | A1 * | 7/2003 | Kondo | 375/295 |
| 2004/0048633 | A1 | 3/2004 | Sato et al. | |
| 2004/0151071 | A1 | 8/2004 | Kocher | |
| 2005/0265125 | A1 | 12/2005 | Yoshida et al. | |
| 2006/0262952 | A1 | 11/2006 | Wagner et al. | |
| 2007/0064542 | A1 * | 3/2007 | Fukushima | 368/282 |
| 2007/0242771 | A1 * | 10/2007 | Kondo | 375/295 |
| 2007/0246494 | A1 * | 10/2007 | Kim et al. | 224/219 |
| 2007/0270187 | A1 | 11/2007 | Haneda | |
| 2007/0279852 | A1 | 12/2007 | Daniel et al. | |
| 2008/0037375 | A1 | 2/2008 | Ellner et al. | |
| 2008/0318636 | A1 * | 12/2008 | Kim | 455/566 |
| 2009/0009470 | A1 * | 1/2009 | Choi et al. | 345/158 |
| 2009/0048001 | A1 | 2/2009 | Mihara et al. | |
| 2009/0061958 | A1 | 3/2009 | Osgood | |
| 2009/0069045 | A1 | 3/2009 | Cheng | |
| 2009/0195350 | A1 | 8/2009 | Tsern et al. | |
| 2009/0219788 | A1 | 9/2009 | Henley, Jr. | |
| 2009/0231960 | A1 | 9/2009 | Hutcheson | |
| 2010/0219943 | A1 | 9/2010 | Vanska et al. | |
| 2011/0003665 | A1 * | 1/2011 | Burton et al. | 482/9 |
| 2011/0012796 | A1 | 1/2011 | Kim et al. | |
| 2011/0059771 | A1 * | 3/2011 | Kondo | 455/556.2 |
| 2011/0127325 | A1 * | 6/2011 | Hussey et al. | 235/380 |
| 2011/0139868 | A1 | 6/2011 | Baker | |
| 2011/0205851 | A1 | 8/2011 | Harris | |
| 2012/0030043 | A1 * | 2/2012 | Ross et al. | 705/16 |

* cited by examiner

SMART-WATCH WITH USER INTERFACE FEATURES

FIELD

The present disclosure relates to user interface features included in a smart-watch.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A variety of portable user devices provide wireless network connectivity. Various features of a device often compete for space on the device. For example, the available space for a tactile interface may be sized relative to display requirements. Further, the ability to customize a device may be limited to changing display options on a fixed set of hardware associated with the device. Additionally, as technology evolves, the device may require significant modifications or complete replacement to remain relevant to the evolving technology.

SUMMARY

In some embodiments of the present disclosure, a smart-watch is disclosed. The smart-watch can include a wristband, a base, a battery and first and second touchpads. The wristband can include a voltage line, a data line, and a clock line. The base can be coupled to the wristband and include a housing, a processor in communication with the data line and the clock line, and a wireless transceiver in communication with the processor, the wireless transceiver configured to connect to a wireless network. The battery can be coupled to the housing and be in communication with the processor and the voltage line. The first touchpad can be located on a first side of the base and be in communication with the data line and the clock line. Further, the first touchpad can be powered by the battery and configured to provide tactile interaction between a user and the smart-watch. The second touchpad can be located on a second side of the base opposite the first side and be in communication with the data line and the clock line. The second touchpad can be powered by the battery and be configured to provide tactile interaction between the user and the smart-watch.

In some embodiments of the present disclosure, a smart-watch is disclosed. The smart-watch can include a wristband, a base, a battery and a first auxiliary component. The wristband can include a voltage line. The base can be coupled to the wristband and include a housing, a processor, and a wireless transceiver in communication with the processor. The wireless transceiver can be configured to connect to a wireless network. The battery can be coupled to the housing and be in communication with the processor and the voltage line. The first auxiliary component can be coupled to the wristband in communication with the voltage line and be powered by the battery.

In some embodiments of the present disclosure, a smart-watch is disclosed. The smart-watch can include a wristband, a base, a battery, a first touchpad and a second touchpad. The base can be coupled to the wristband and include: a housing, a processor, and a wireless transceiver in communication with the processor. The wireless transceiver can be configured to connect to a wireless network. The battery can be coupled to the housing and be in communication with the processor. The first touchpad can be located on a first side of the base and be in communication with the processor. The first touchpad can be configured to provide tactile interaction between a user and the smart-watch. The second touchpad can be located on a second side of the base opposite the first side. Further, the second touchpad can be in communication with the processor and be configured to provide tactile interaction between the user and the smart-watch.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
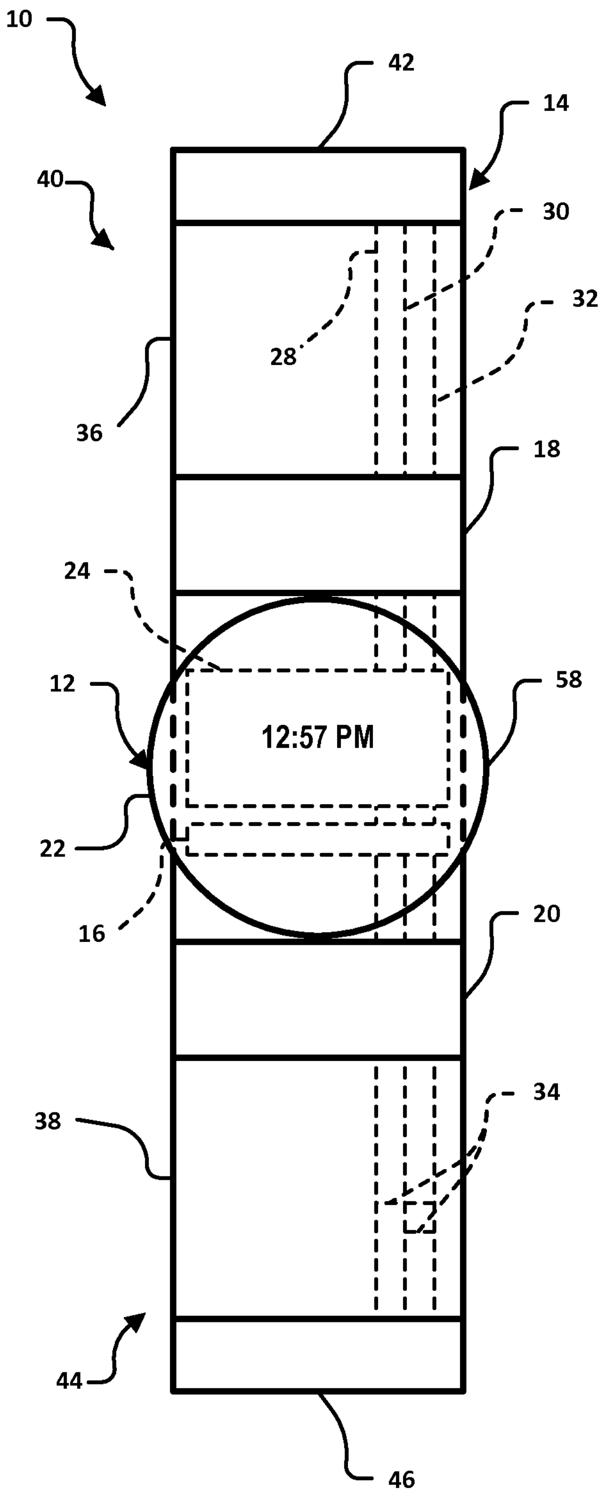
FIG. 1 is a schematic illustration of an example smart-watch according to some embodiments of the present disclosure.
Figure 2:
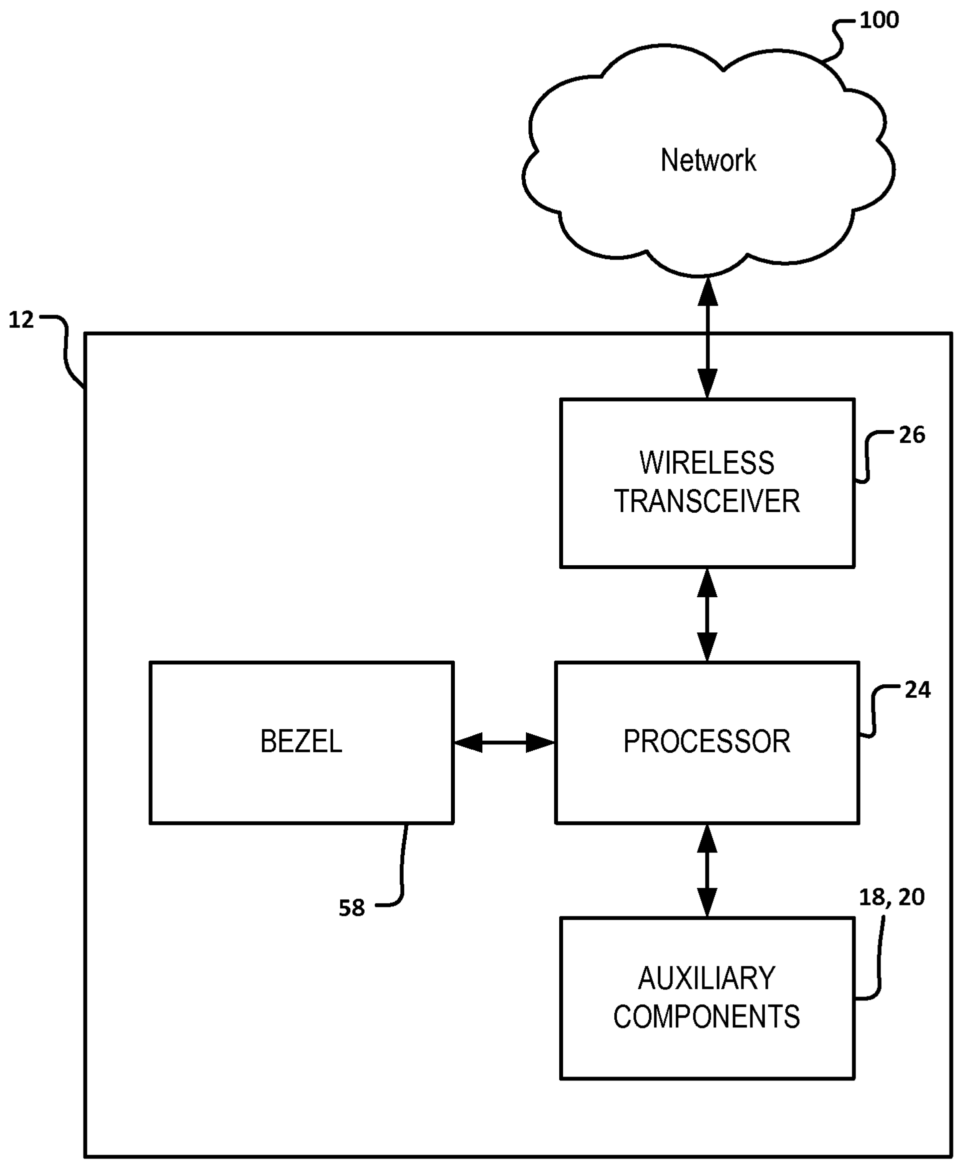
FIG. 2 is a schematic block diagram of the smart-watch shown in FIG. 1.

Referring now to FIG. 1, a smart-watch 10 is schematically illustrated. The smart-watch 10 may include a base 12, a wristband 14 coupled to the base 12, a battery 16 coupled to the base 12, a first auxiliary component 18 and a second auxiliary component 20. With additional reference to FIG. 2, the base 12 may include a housing 22, a processor 24 coupled to the housing 22 and a wireless transceiver 26 coupled to the housing 22. The battery 16 may be coupled to the housing 22 and may be in communication with, and provide power to, the processor 24 and other components of the smart-watch 10, as described below. The wireless transceiver 26 may be in communication with the processor 24 and may provide communication between the processor 24 and a wireless network 100. Examples of the wireless network 100 include, but are not limited to, the Internet, a wide area network, a local area network, a satellite network, a telecommunications network, a private network, and combinations of these.

The wristband 14 may include a voltage line 28, a serial data line 30 and a serial clock line 32. While described as including a serial data line 30 and a serial clock line 32 in the example included in the present disclosure, it is understood that the smart-watch 10 does not require the use of a serial data line or a serial clock line, but may instead include one or more data lines and/or one or more clock lines. Further, while three separate lines are shown in the Figures, it should be appreciated that the various signals can be provided in a one-line or a two-line arrangement, for example, the voltage and data lines could be incorporated into a single line. The serial data line 30 and the serial clock line 32 may each be connected to the voltage line 28 by resistors 34 and the voltage line 28 may provide a positive voltage supply to the serial data line 30 and the serial clock line 32 via the resistors 34. Additional electronics may be incorporated into the smart-watch 10 to protect the voltage, data and clock lines 28, 30, 32. The battery 16 may be in communication with the voltage line 28. The processor 24 may be in communication with the serial data line 30 and the serial clock line 32.

The first and second auxiliary components 18, 20 may be added to the wristband 14 by connecting each of the first and second auxiliary components 18, 20 to the serial data line 30 and the serial clock line 32 at a location along the wristband 14. Any variety of connections may be employed including (i) direct connections between the first and second auxiliary components 18, 20 and the serial data and clock lines 30, 32, and (ii) indirect connections such as inductive communication between the first and second auxiliary components 18, 20 and the serial data and clock lines 30, 32. First and second auxiliary components 18, 20 are discussed for purposes of illustration only. It is understood that the present disclosure does not require two components and may include any number of components.

The wristband 14 may include a first portion 36 and a second portion 38. The first portion 36 may be coupled to and extend from a first side of the base 12 and the second portion 38 may be coupled to and extend from a second side of base 12 opposite the first side. A first end 40 of the first portion 36 of the wristband 14 may include a first clasp member 42 and a second end 44 of the second portion 38 of the wristband 14 may include a second clasp member 46. The first and second clasp members 42, 46 may be engaged with one another to secure the smart-watch 10 to a user's wrist and close a circuit defined by the voltage line 28 and the battery 16. The first and second clasp members 42, 46 may be disengaged from one another to open a circuit defined by the voltage line 28 and the battery 16 and power off the smart-watch 10.

Alternatively, or additionally, one of the first and second clasp members 42, 46 may define a port or plug that connects to an auxiliary device, such as a computer. By way of non-limiting example, the port or plug may be in the form of a universal serial bus (USB) port or plug. The first and second portions 36, 38 of the wristband 14 may each be in the form of generally continuous members with the voltage line 28, the serial data line 30 and the serial clock line 32 running therethrough.

Figure 3:
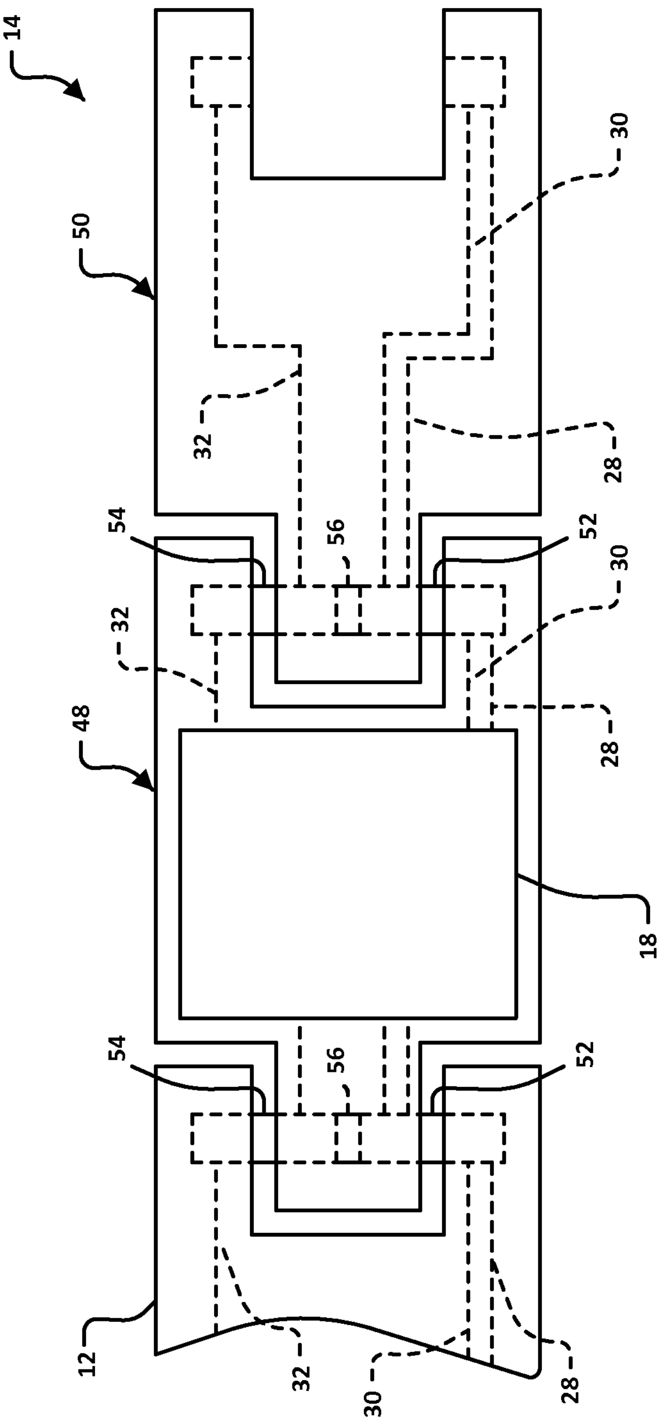
FIG. 3 is a first example link arrangement for the wristband of the smart-watch shown in FIG. 1.

Alternatively, with reference to FIG. 3, the first and second portions 36, 38 may include individual links 48, 50. The links 48, 50 may each include a portion of the voltage line 28, the serial data line 30 and the serial clock line 32. Connectors 52, 54 may be used to provide connections between the voltage line 28, the serial data line 30 and the serial clock line 32 located in adjacent links 48, 50 or in the base 12. Connectors 52, 54 may be two separate members or a single member with an insulator 56 located between the connectors 52, 54. Each link 48, 50 may simply serve as a linkage in the wristband 14 or may form one of the first and second auxiliary components 18, 20. In the example shown in FIG. 3, the link 48 includes the first auxiliary component 18 and the link 50 simply serves as a linkage on the wristband 14.

Providing the first and/or second auxiliary components 18, 20 as a link 48 in the wristband 14 provides for adding or removing auxiliary components from the smart-watch 10. The various arrangements of the wristband 14 discussed above provide a modular system for adding or removing auxiliary components from the smart-watch 10. By way of non-limiting example, the first auxiliary component 18 may form a first modular component removably connected to the wristband 14 and the second auxiliary component 20 may form a second modular component removably connected to the wristband 14. For example, the link 50 may be replaced with a link including an auxiliary component and the link 48 may be replaced with a link including a different auxiliary component or with a link similar to the link 50.

Figure 5:
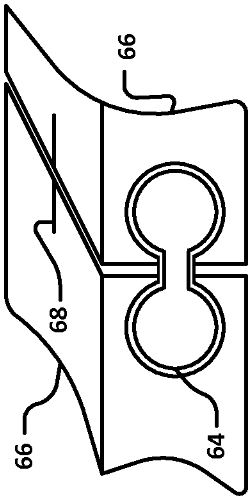
FIG. 5 is a third example link arrangement for the wristband of the smart-watch shown in FIG. 1.
Figure 4:
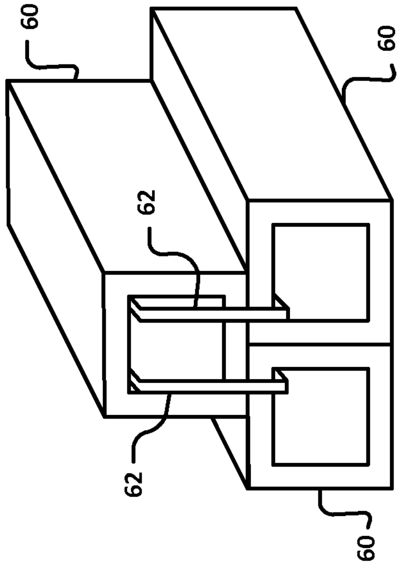
FIG. 4 is a second example link arrangement for the wristband of the smart-watch shown in FIG. 1.

It is understood that the linkage arrangement shown in FIG. 3 is one non-limiting example, and that the present disclosure applies to a variety of alternate linkage arrangements including, but not limited to, the examples shown in FIGS. 4 and 5. Essentially, any arrangement in which conductive and non-conductive parts are separated from one another by an insulating barrier may be acceptable. In some embodiments, conductive parts may form a chain having separable signals (power, ground, clock, etc.) that form a low impedance path to maximize the signal and power along the chain.

The example shown in FIG. 4 includes a double-layer wristband, where links 60 may be connected via connectors 62. By way of non-limiting example, the connectors 62 may be metal and may house a two-wire bus that connects the auxiliary components to the processor 24. The example shown in FIG. 5 includes a dumbbell connection 64 between adjacent links 66. Wiring may be on either side of the dumbbell connection 64 with an insulator 68 in the middle to separate them. A variety of seals may be used in the various linkage designs to isolate the connections from moisture.

In a first arrangement, the first auxiliary component 18 may include a first touchpad and the second auxiliary component 20 may include a second touchpad. The first touchpad is located on a first side of the base 12 and the second touch is located on a second side of the base 12 opposite the first side. Locating first and second touchpads on opposite sides of the base 12 may generally provide a greater surface area for a tactile-based user interface and may support touchpad functions including, but not limited to, pinch, stretch and scroll on a platform with limited space available for user input. Additionally, in the arrangement including the first and second touchpads, the processor 24 may coordinate the inputs between the first and second touchpads relative to one another to accommodate functions such as pinch, stretch, and tap up/down using both the first and second touchpads. The base 12 may provide an additional tactile-based user interface. More specifically, the base 12 may include a bezel 58 having a conductive surface in communication with the processor 24 that provides a tactile-based user input to the processor 24 for functions such as rotate.

Alternatively, the first and/or second auxiliary components 18, 20 may include an additional display. The additional display may be in the form of a display with or without touchscreen functionality. Further, the first and/or second auxiliary components 18, 20 may include a decorative component. By way of non-limiting example, the decorative component may include a lighted component, such as a light emitting diode (LED), powered by the battery 16.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A smart-watch comprising:
a wristband including:
a voltage line,
a data line, and
a clock line;
a base coupled to the wristband and including:
a housing,
a processor in communication with the data line and the clock line, and
a wireless transceiver in communication with the processor, the wireless transceiver configured to connect to a wireless network;
a battery coupled to the housing and in communication with the processor and the voltage line; and
a first touchpad located on a first side of the base, the first touchpad in communication with the data line and the clock line, the first touchpad being powered by the battery and configured to provide tactile interaction between a user and the smart-watch; and
a second touchpad located on a second side of the base opposite the first side, the second touchpad in communication with the data line and the clock line, the second touchpad being powered by the battery and configured to provide tactile interaction between the user and the smart-watch, the processor being configured to provide a coordinated output based on a tactile-based user input to the first touchpad relative to a tactile-based user input to the second touchpad, the coordinated output including at least one of a pinch function, a stretch function and a tap up or down function.

2. The smart-watch of claim 1, wherein the first and second touchpads are located on the wristband.

3. The smart-watch of claim 2, wherein the first touchpad forms a first modular component removably connected to the wristband via a linkage providing communication between the first touchpad and the data line and providing communication between the first touchpad and the clock line.

4. The smart-watch of claim 1, wherein the base includes a watch face and a bezel region surrounding the base, the bezel region having a surface in communication with the processor and configured to provide a tactile-based user input to the processor.

5. A smart-watch comprising:
a wristband;
a base coupled to the wristband and including:
a housing,
a processor,
a wireless transceiver in communication with the processor, the wireless transceiver configured to connect to a wireless network; and
a watch face and a bezel region surrounding the base, the bezel region having a surface in communication with the processor and configured to provide a tactile-based user input from the bezel region to the processor;
a battery coupled to the housing and in communication with the processor;
a first touchpad located on a first side of the base, the first touchpad in communication with the processor and configured to provide tactile interaction between a user and the smart-watch; and
a second touchpad located on a second side of the base opposite the first side, the second touchpad in communication with the processor and configured to provide tactile interaction between the user and the smart-watch, the processor being configured to provide a coordinated output based on a tactile-based user input to the first touchpad relative to a tactile-based user input to the second touchpad, the coordinated output including at least one of a pinch function, a stretch function and a tap up or down function.

6. The smart-watch of claim 5, wherein the first and second touchpads are located on the wristband.

7. The smart-watch of claim 6, wherein the wristband includes a voltage line, a data line and a clock line, the first and second touchpads each being in communication with the data line and the clock line.

8. The smart-watch of claim 7, wherein the first touchpad is removably connected to the wristband via a first linkage providing communication between the first touchpad and the data and clock lines and the second touchpad is removably connected to the wristband via a second linkage providing communication between the second touchpad and the data and clock lines.

* * * * *